United States Patent
Diederiks et al.

(10) Patent No.: US 7,444,187 B2
(45) Date of Patent: Oct. 28, 2008

(54) METHOD FOR CONTROLLING LIGHTING PARAMETERS, CONTROLLING DEVICE, LIGHTING SYSTEM

(75) Inventors: Elmo Marcus Attila Diederiks, Eindhoven (NL); Josephus Hubertus Eggen, Eindhoven (NL); Jasper Ivo Van Kuijk, Delft (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 119 days.

(21) Appl. No.: 10/545,346

(22) PCT Filed: Feb. 2, 2004

(86) PCT No.: PCT/IB2004/050070

§ 371 (c)(1),
(2), (4) Date: Aug. 11, 2005

(87) PCT Pub. No.: WO2004/072840

PCT Pub. Date: Aug. 26, 2004

(65) Prior Publication Data

US 2006/0139922 A1    Jun. 29, 2006

(30) Foreign Application Priority Data

Feb. 14, 2003   (EP)   .................... 03100337

(51) Int. Cl.
*G05B 11/01*   (2006.01)
*G05B 13/02*   (2006.01)
*G06F 3/048*   (2006.01)

(52) U.S. Cl. ............................. 700/17; 700/28; 715/764

(58) Field of Classification Search ............ 355/69–70; 345/706; 359/227, 230; 361/173, 197; 40/442, 40/463

See application file for complete search history.

(56) References Cited

U.S. PATENT DOCUMENTS

| 4,733,068 | A | * | 3/1988 | Thiele et al. | ............ 250/227.14 |
| 4,939,428 | A | * | 7/1990 | DePauli | ........................ 315/291 |
| 5,093,769 | A | * | 3/1992 | Luntsford | .................... 362/269 |
| 5,250,799 | A | * | 10/1993 | Werner | .................. 250/214 AL |
| 5,357,170 | A | * | 10/1994 | Luchaco et al. | ............. 315/159 |
| 5,445,000 | A | * | 8/1995 | Brown | ........................ 72/31.01 |
| 5,487,054 | A |   | 1/1996 | Capps et al. | |
| 5,769,527 | A | * | 6/1998 | Taylor et al. | ................... 362/85 |
| 6,088,527 | A | * | 7/2000 | Rybczynski | .................... 396/1 |

(Continued)

FOREIGN PATENT DOCUMENTS

DE    10119648 A    10/2002

(Continued)

OTHER PUBLICATIONS

Fitzmaurice G. W. et al; Bricks; Laying the Foundations for Graspable User Interfaces; Conference, May 1995, pp. 442-449, new.

*Primary Examiner*—Albert DeCady
*Assistant Examiner*—Sunray R Chang

(57) ABSTRACT

A controlling device for controlling lighting parameters is connected to a number of lamps and includes a controlling member which is placed on a contact surface by a user. Lighting parameters of each lamp are determined based on the position of the controlling member on the contact surface. This enables the user to control the lighting parameters simply by controlling the position of the controlling member.

20 Claims, 4 Drawing Sheets

U.S. PATENT DOCUMENTS

| | | | |
|---|---|---|---|
| 6,238,216 B1 * | 5/2001 | Menelly | 434/284 |
| 6,369,721 B1 * | 4/2002 | Yang et al. | 341/21 |
| 6,529,853 B1 * | 3/2003 | Bauer | 702/152 |
| 6,635,999 B2 * | 10/2003 | Belliveau | 315/149 |
| 6,865,036 B1 * | 3/2005 | Kuwakino | 359/824 |
| 6,894,443 B2 * | 5/2005 | Hunt et al. | 315/312 |
| 7,369,903 B2 * | 5/2008 | Diederiks et al. | 700/28 |
| 2002/0067144 A1 | 6/2002 | Hoffknecht et al. | |
| 2003/0193482 A1 * | 10/2003 | Kim | 345/173 |
| 2004/0046795 A1 * | 3/2004 | Josephson et al. | 345/764 |
| 2004/0160199 A1 * | 8/2004 | Morgan et al. | 315/312 |
| 2005/0149639 A1 * | 7/2005 | Vrielink et al. | 710/8 |
| 2006/0058925 A1 * | 3/2006 | Diederiks et al. | 700/291 |
| 2006/0062424 A1 * | 3/2006 | Diederiks et al. | 382/100 |
| 2006/0071605 A1 * | 4/2006 | Diederiks | 315/76 |

FOREIGN PATENT DOCUMENTS

EP        0564278 A1    10/1993

* cited by examiner

METHOD FOR CONTROLLING LIGHTING PARAMETERS, CONTROLLING DEVICE, LIGHTING SYSTEM

The present invention relates to a method for controlling at least one parameter, especially a parameter which is related to lighting.

The invention further relates to a controlling device for controlling such a parameter.

The invention further relates to a lighting system comprising such a controlling device.

In general, the way in which people apply lighting in their homes depends on the situation. For example, when a person wants to read a newspaper, he switches on a reading lamp and positions the newspaper within reach of the beam of light of the reading lamp. In such a situation, lighting is used in a functional way. In another situation, for example when a person has visitors, he switches on various table lamps, in order to create a cosy atmosphere.

Two main problems are associated with the above-described routine. In the first place, in most situations, a person needs to perform several actions in order to obtain an appropriate light setting, since various lamps need to be switched on, and all lamps need to be operated separately. In the second place, a person has to take the initiative and remember which lamps need to be switched on and which lamps should not be used or need not be used in order to obtain a suitable light setting for a specific situation.

The method according to the present invention allows people to instantly and intuitively control multiple lamps to obtain certain light settings, wherein all lamps can be operated simultaneously.

According to an important aspect of the present invention, at least one controlling member is positioned with respect to a reference plane, and the position of the controlling member with respect to the reference plane is determined. Within the scope of the present invention, the controlling member may be positioned such that contact is established between the controlling member and a contact surface, wherein the reference plane is associated with the contact surface.

The information regarding the position of the controlling member is used to determine at least one parameter, for example light intensity. In this way, a person is able to control the light setting by simply moving the controlling member with respect to the reference plane until a desired light setting is obtained.

The present invention will now be explained in greater detail with reference to the figures, in which similar parts are indicated by the same reference signs, and in which.

Figure 1:
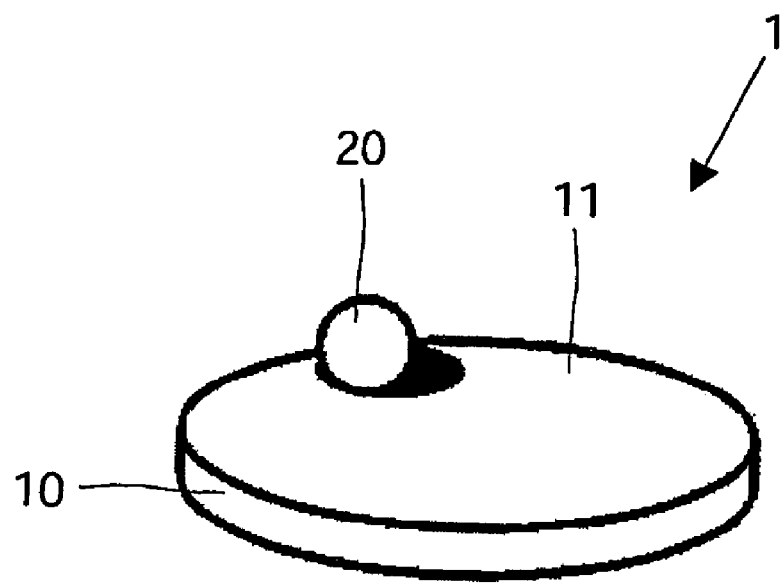
FIG. 1 is a perspective view of a controlling device according to the present invention, comprising one controlling member.
Figure 2:
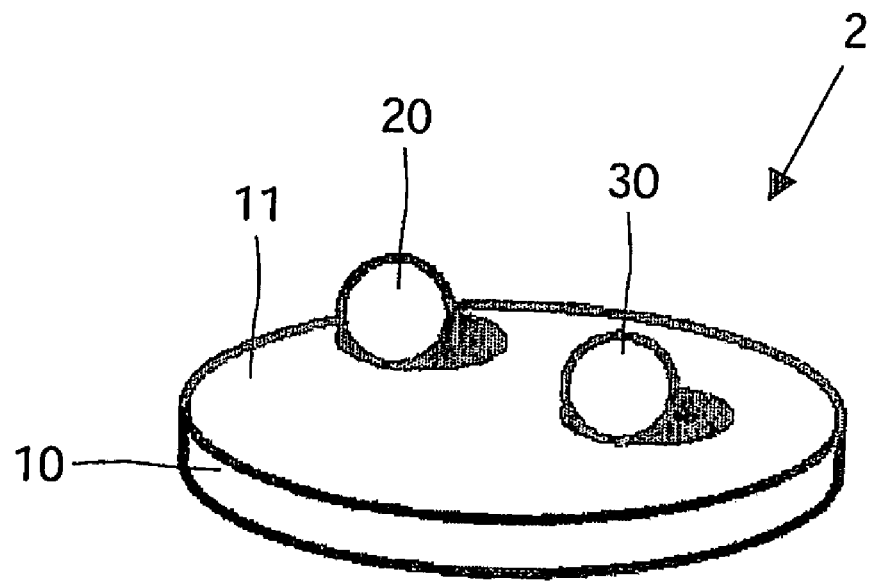
FIG. 2 is a perspective view of the controlling device according to the present invention, comprising two controlling members.
Figure 3:
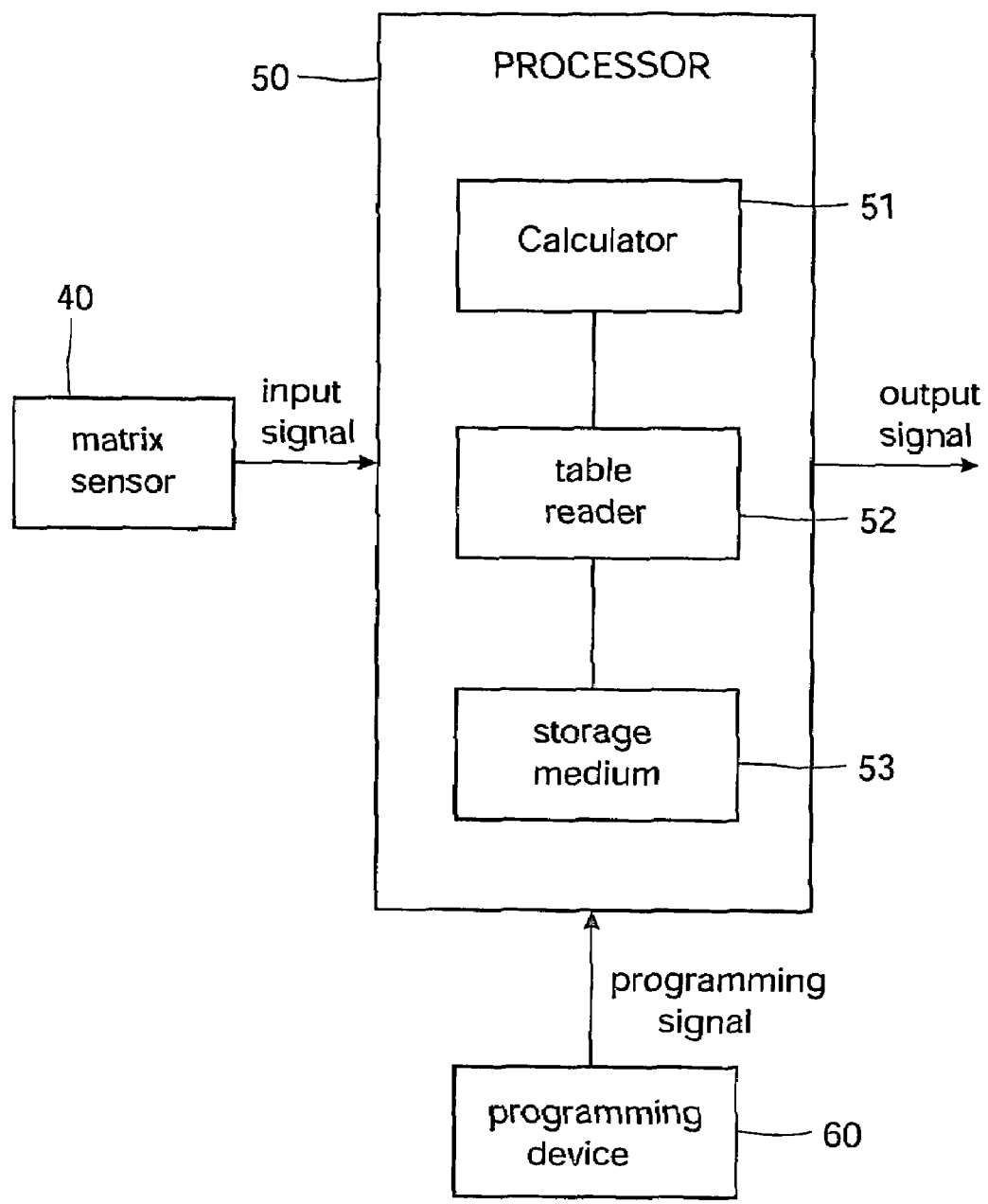
Figure 4:
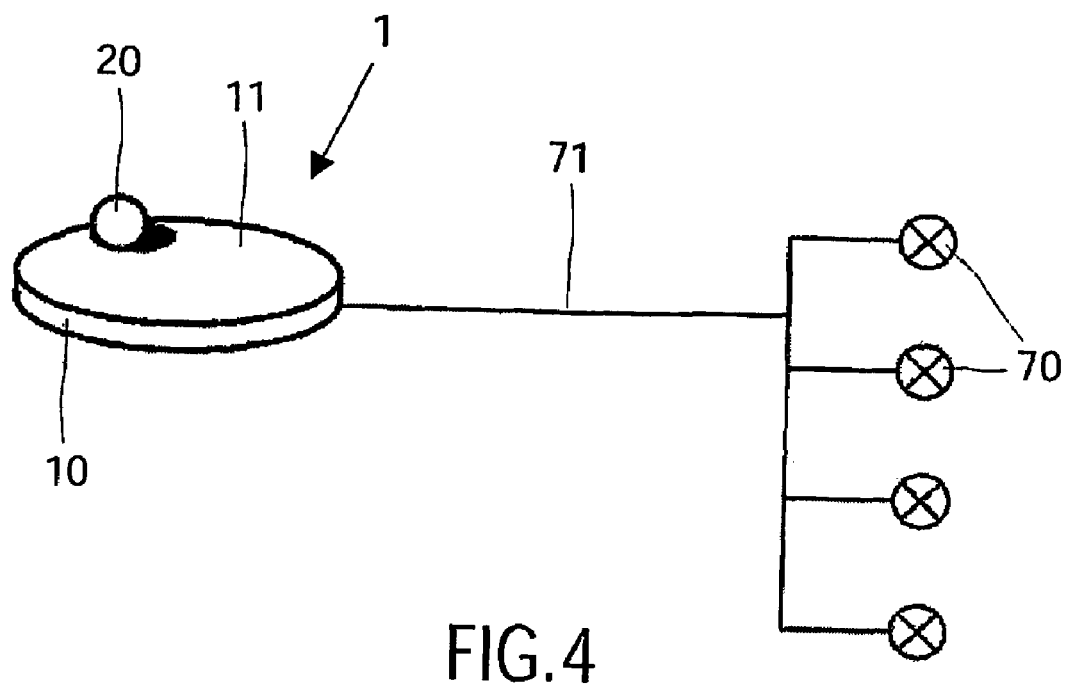
Figure 5:
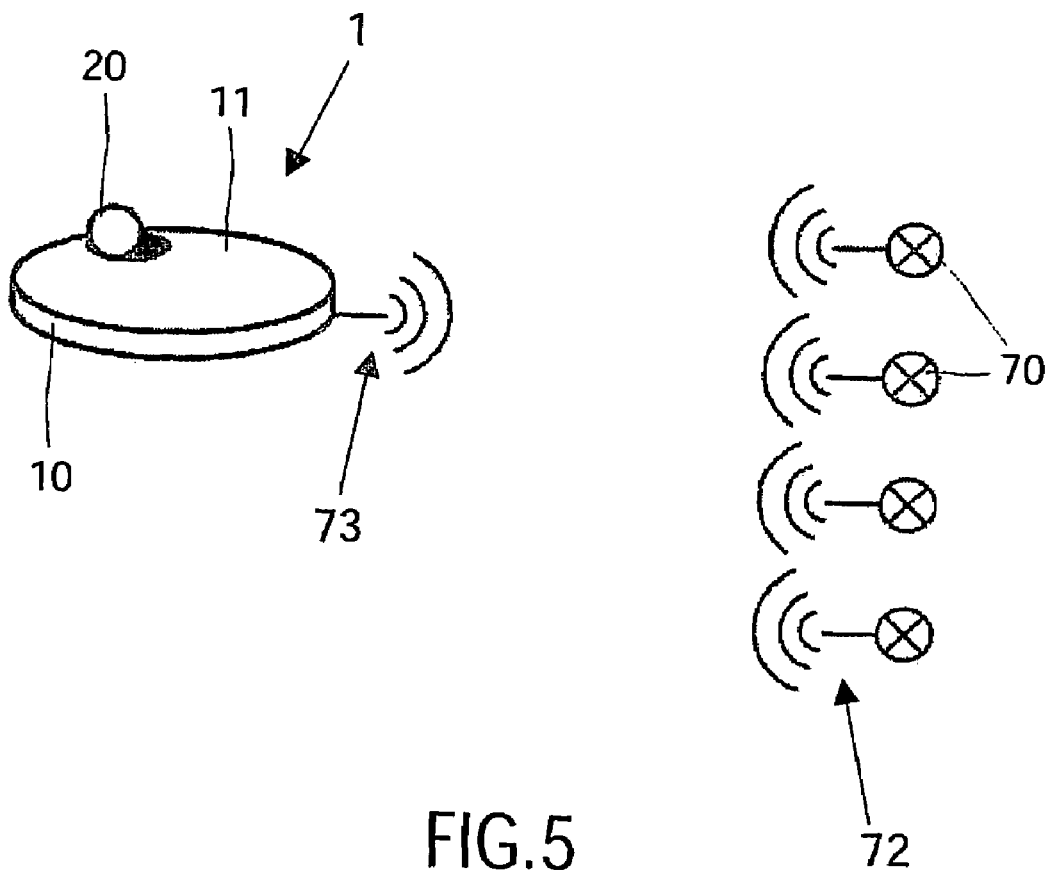
Figure 6:
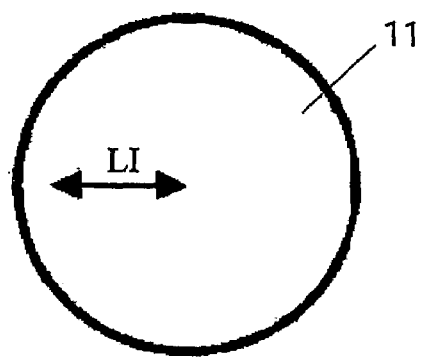
Figure 7:
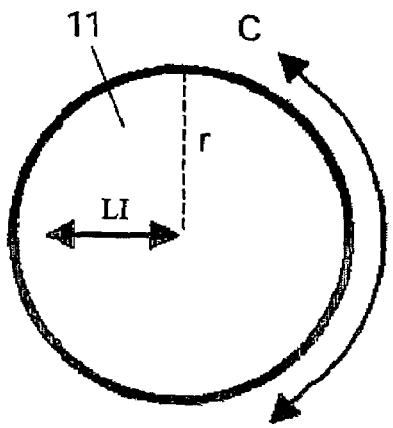
Figure 8:
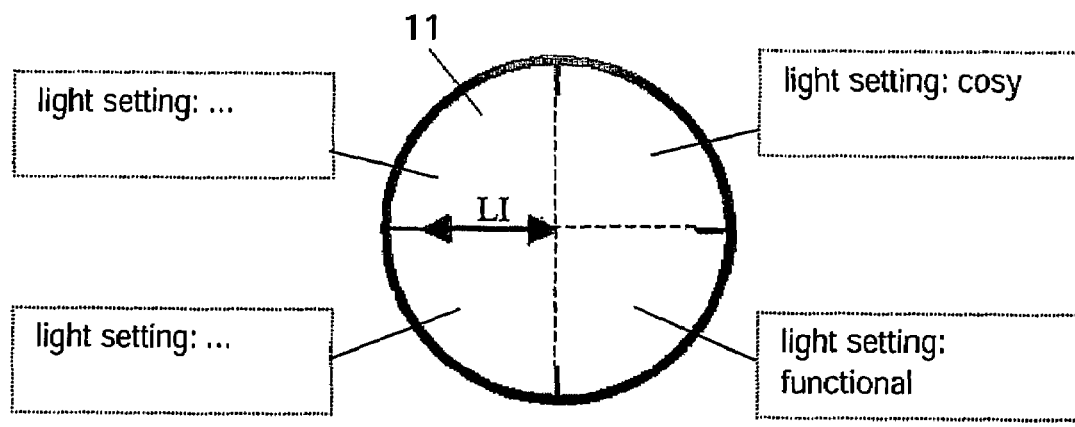

FIG. 3 diagrammatically shows components of the controlling device according to the present invention;

FIG. 4 diagrammatically illustrates a first preferred way of connecting the controlling device as shown in FIG. 1 to a number of lamps;

FIG. 5 diagrammatically illustrates a second preferred way of connecting the controlling device as shown in FIG. 1 to a number of lamps;

FIG. 6 diagrammatically shows a first preferred categorization of a contact surface of the controlling device as shown in FIGS. 1 and 2;

FIG. 7 diagrammatically shows a second preferred categorization of the contact surface of the controlling device as shown in FIGS. 1 and 2; and FIG. 8 diagrammatically shows a third preferred categorization of the contact surface of the controlling device as shown in FIGS. 1 and 2.

FIG. 1 shows a controlling device 1 according to the present invention, which comprises a sensor disc 10 and one controlling member 20. The sensor disc 10 comprises a contact surface 11. In the shown example, the sensor disc 10 has a cylindrical shape, wherein the contact surface 11 is formed by one of the end surfaces of the sensor disc 10, and consequently has a circular shape. Further, in the shown example, the controlling member 20 is shaped as a ball.

FIG. 2 shows a controlling device 2 according to the present invention. An important difference between this controlling device 2 and the above-described controlling device 1 is that this controlling device 2 comprises an extra controlling member 30.

FIG. 3 diagrammatically shows components of the sensor disc 10. At the contact surface 11, the sensor disc 10 comprises a matrix sensor 40 which is capable of detecting the presence and the position of one or more objects being placed on the contact surface 11. The matrix sensor 40 is operatively connected to a processor 50 having a calculator 51, a table reader 52 and a storage medium 53. Preferably, the sensor disc 10 further comprises a programming device 60. However, such a device is not an essential element of the controlling device 1, 2 according to the present invention and may be omitted.

When a controlling member 20, 30 is placed on the contact surface 11, the matrix sensor 40 is activated by the pressure being exerted by the controlling member 20, 30, at the position where the controlling member 20, 30 contacts the contact surface 11, which will hereinafter be referred to as the contact position. The matrix sensor 40 generates and transmits an input signal containing information regarding the contact position to the processor 50. The information may for example comprise two coordinates, by means of which the position of the controlling member 20, 30 is exactly determined with respect to a reference system.

In a situation in which the contact surface 11 is not contacted by any controlling member 20, 30 at all, the matrix sensor 40 generates a default input signal. In a situation in which two or more controlling members 20, 30 are placed simultaneously on the contact surface 11, an input signal is generated which contains information regarding the positions of all controlling members 20, 30.

In the processor 50, the calculator 51 is utilized to calculate an average when the input signal contains information originating from more than one controlling member 20, 30. For example, in a situation of two controlling members 20, 30 being placed on the contact surface 11, the input signal comprises two sets of coordinates. In such case, the calculator 51 calculates an average set of coordinates.

In the storage medium 53 of the processor 50, combinations of sets of coordinates and output signals are stored as a table. The table reader 52 is for looking up in the stored table which output signal is associated with a given set of coordinates. In the process, extrapolation techniques may be applied in order to obtain this output signal.

A user of the controlling device 1, 2 may adjust the stored table according to his personal wishes by means of a programming device 60, which is able to transmit a programming signal to the storage medium 53 on the basis of the input given by the user.

The controlling device 1, 2 according to the present invention may for example be used to control the light intensity of at least one lamp 70. In FIGS. 4 and 5, an example is shown in which four lamps 70 are connected to the controlling device 1, through the power line or a dedicated bus. It will be understood that the number of lamps 70 may be chosen freely within the scope of the present invention. During operation, the output signal may be transmitted by means of a wire 71 to the lamps 70, as diagrammatically shown in FIG. 4. Another possibility, which is illustrated by means of FIG. 5, is that the connection between the lamps 70 and the controlling device 1 is wireless.

Within the scope of the present invention, it is possible that each lamp 70 is individually connected to the controlling device 1. This possibility is illustrated by means of FIG. 5, in which it is diagrammatically shown that each lamp 70 has its own receiver 72 for receiving the output signal being transmitted by a sender 73 of the controlling device 1. Another possibility is that the lamps 70 are connected in parallel to the controlling device 1. This possibility is illustrated by means of FIG. 4, in which it is diagrammatically shown that the lamps 70 are connected as a group to the controlling device 1.

Each lamp 70 may have a unique address, so that the lamps 70 can be individually controlled. In such case, the output signal contains specific information for each specific lamp 70.

The information regarding the position of at least one controlling member 20, 30 can be used to control just one parameter, for example the light intensity of the lamps 70. This possibility is illustrated by means of FIG. 6, in which the relation between the contact position on the contact surface 11 and the light intensity of the lamps 70 is diagrammatically depicted by means of an arrow LI. In this example, the light intensity of the lamps 70 increases when the controlling member 20, 30 is moved towards the circumference of the contact surface 11, and the light intensity of the lamps 70 decreases when the controlling member 20, 30 is moved towards the centre of the contact surface 11.

It is very advantageous to use a ball-shaped controlling member 20, 30, as such a controlling member 20, 30 can very easily be rolled along the contact surface 11 to a desired position. A user can judge a current setting of the light intensity on the basis of the position of the controlling member 20, 30 on the contact surface 11, knowing the relation between these two parameters. Of course, the user can also judge the current setting of the light intensity by looking to the lamps 70 and by sensing the light setting of the room in which the lamps 70 are placed. By just sensing the effect of a movement of the controlling member 20, 30 along the contact surface 11, the user is able to intuitively control the light intensity of the lamps 70 without actually looking at the controlling device 1, 2.

The information regarding the position of at least one controlling member 20, 30 can also be used to simultaneously control two parameters, for example the light intensity and the colour of the lamps 70. This possibility is illustrated by means of FIG. 7, in which the relation between the contact position and the light intensity of the lamps 70 is diagrammatically depicted by means of an arrow LI, and in which the relation between the contact position and the colour of the lamps 70 is diagrammatically depicted by means of an arrow C. In this example, the light intensity of the lamps 70 is determined by the position of the controlling member 20, 30 with respect to the centre of the contact surface 11, and the colour of the lamps 70 is determined by the angular displacement of a radial line crossing the contact position with respect to a reference radial line r, wherein a radial line is defined as a line extending from the centre of the contact surface 11 to the circumference of the contact surface 11.

In another embodiment of the present invention, the contact surface 11 of the controlling device 1, 2 is categorized according to the example as shown in FIG. 8. In this example, each quarter of the contact surface 11 corresponds to a certain light setting, for example a cosy light setting or a functional light setting. Additionally, the light intensity can be adjusted by moving the controlling member 20, 30 towards the centre of the contact surface 11 and from the centre of the contact surface 11. On application of the shown contact surface 11, more than two parameters may be controlled simultaneously, as the light settings may be characterized by more than one parameter. Preferably, the transitions between the different settings are smooth, so that abrupt changes between different light settings will not occur.

It will be understood that there are many more possibilities for the categorization of the contact surface 11 than the three described examples. The categorization may be indicated on the contact surface 11, in order to help a user in finding a desired light setting.

The categorization of the contact surface 11 is laid down in the table being stored in the storage medium 53. In a situation in which the controlling device 1, 2 comprises a programming device 60, the categorization of the contact surface 60 may be changed by a user. Advantageously, two or more tables are stored in the storage medium 53, so that the user is able to choose from a number of predetermined categorizations.

In the following, steps of a controlling process are described, which steps may subsequently take place when the controlling device 1 having one controlling member 20 is used:

Contact is established between the controlling member 20 and the contact surface 11 at a certain position on the contact surface 11, which is referred to as contact position.

The controlling member 20 exerts a pressure on the contact surface 11. This pressure activates the matrix sensor 40, which transmits an input signal containing information regarding the contact position. For example, the contact position may be indicated by means of two coordinates with respect to a reference system.

The input signal is received by the processor 50. The table reader 52 compares the information of the input signal regarding the contact position with stored information in the table in the storage medium 53, until a match is found or calculated by means of for example extrapolation techniques. The associated characteristics of the output signal are then found in the table or calculated on the basis of the table.

The output signal is sent to the lamps 70 which are connected to the controlling device 1.

During operation, these steps are repeated. A user can change the light setting by changing the position of the controlling member 20 on the contact surface 11, as the output signal of the controlling device is determined on the basis of this contact position.

When the controlling device 2 having two controlling members 20, 30 is used, the contact surface 11 is contacted simultaneously at two contact positions. Consequently, the matrix sensor 40 transmits an input signal containing information regarding the two contact positions. In such case, the calculator 51 determines a fictitious average contact position, which is used by the table reader 52 in order to find an associated output signal on the basis of the table in the storage medium 53. In this way, two users are able to influence the light setting, wherein the obtained light setting is an average of the desired light settings. In this respect, it is possible to use different controlling members 20, 30, and to enable the matrix sensor 40 to sense which contact position is related to which controlling member 20, 30. The average may then be a weighted average according to preset weighing rates.

Another suitable embodiment of the controlling device according to the present invention (not shown), which may also be used by two users, comprises two units having a contact surface 11 and a matrix sensor 40, wherein both units are connected to the processor 50. During operation of such a controlling device, the processor 50 receives two input signals, each input signal containing information regarding the position of a controlling member 20, 30 on one of the contact surfaces 11. In this embodiment, the calculator 51 is utilized to calculate a fictitious average contact position on the basis of the input signals.

It will be clear to a person skilled in the art that the scope of the present invention is not limited to the examples discussed in the foregoing, but that several amendments and modifications thereof are possible without deviating from the scope of the present invention as defined in the attached claims.

In the foregoing explanation of the present invention, it is disclosed that the contact position of the controlling member 20, 30 on a contact surface determines the output signal generated by the controlling device 1, 2. The contact surface can therefore be regarded as a reference plane, which is defined as a plane with respect to which the position of the controlling member 20, 30 is determined. Within the scope of the present invention, the reference plane does not necessarily need to be associated with the contact surface for supporting the controlling member 20, 30. For example, an optical sensor may be placed above the controlling member 20, 30 and the contact surface 11, wherein the position of the controlling member 20, 30 with respect to the optical sensor determines the output signal. In such case, the reference plane is associated with the optical sensor rather than the contact surface.

The controlling device 1, 2 according to the present invention may comprise different components than the components as diagrammatically shown in FIG. 3 and as explained in the foregoing. Instead of the shown matrix sensor 40, any suitable component for sensing the position of one or more controlling members 20, 30 with respect to the reference plane may be utilized. For example, as already indicated in the foregoing, the controlling device 1, 2 may comprise an optical sensor. The optical sensor may comprise an optical matrix like a CCD.

The calculator 51 for determining a fictitious average position may be omitted when only one controlling member 20, 30 is applied. Instead of using a table in a storage medium 53 and a table reader 52 for retrieving data from the table and determining data on the basis of the table, it is also possible to use an arithmetic unit which determines an output signal on the basis of a certain relation. For example, in case of the contact surface 11 being categorized according to the examples as illustrated by means of FIGS. 6 and 7, it is very well possible to use a relation instead of a table.

The contact surface 11 does not necessarily have to be entirely flat. Further, the contact surface 11 can have another shape than circular, for example rectangular.

The controlling members 20, 30 may be shaped as balls, as is the case in the shown examples, but the controlling members 20, 30 may also be shaped differently, for example as cubes. It is important that the shape of the controlling members 20, 30 is such that the controlling members 20, 30 can be placed on the contact surface 11 in a stable manner. It is preferred that the controlling members 20, 30 are objects which can easily be held and moved by a user, and which can easily be displaced with respect to the contact surface 11. During displacement of a controlling member 20, 30, contact between the controlling member 20, 30 and the contact surface 11 may be maintained, but it is also possible to lift the controlling member 20, 30 from the starting position and place the controlling member 20, 30 at a desired end position without meanwhile contacting the contact surface 11. Preferably, when the contact is interrupted during displacement, a default light setting is assumed during the interruption. When the contact is maintained during displacement, the light setting may change continuously or in discrete steps, dependent on the algorithm applied by the processor 50 in determining the output signal.

There are numerous possibilities for the design of the controlling device 1, 2 according to the present invention, wherein the contact surface 11 as well as the controlling members 20, 30 may have any suitable shape. For example, the controlling device 1, 2 may comprise pebbles and a disc, wherein the pebbles function as controlling members 20, 30, and wherein the disc comprises the contact surface 11. The controlling members 20, 30 may be designed such as to be attachable to the contact surface 11.

The present invention relates to situations in which at least one passive controlling member 20, 30 is utilized as well as to situations in which at least one active controlling member 20, 30 is utilized. An important feature of an active controlling member 20, 30 is that such a controlling member 20, 30 is able to actively transmit a signal. An active controlling member 20, 30 may for example be able to emit infrared light, wherein an optical sensor is provided to receive the infrared light signal. It will be understood that a passive controlling member 20, 30 is not capable of actively transmitting a signal.

The contact between the controlling member 20, 30 and the contact surface 11 does not necessarily need to be a point contact. For example, if the controlling member 20, 30 has the shape of a cube, a contact area is present between the controlling member 20, 30 and the contact surface 11, having the shape of a square.

Within the scope of the present invention, additional measures may be taken in order to assure stable contact between the controlling members 20, 30 and the contact surface 11. For example, the materials of the controlling members 20, 30 and the contact surface 11 may be chosen such that the controlling members 20, 30 are held at their contact positions on the contact surface 11 through magnetic forces. In this respect, it is important that the additional forces are relatively low, so that a user will be able to break the contact between a controlling member 20, 30 and the contact surface 11 without using much force.

The controlling device 1, 2 according to the present invention may be used to control other parameters than lighting parameters. For example, the controlling device 1, 2 may be coupled to sound equipment, and may be used to control sound parameters such as volume.

In the foregoing, a controlling device 1, 2 for controlling at least one parameter is described. In a possible application, the controlling device 1, 2 is connected to a number of lamps 70. The controlling device 1, 2 comprises at least one controlling member 20, 30, which is placed on a contact surface 11 by a user. Lighting parameters of each lamp 70 are determined on the basis of the position of the controlling member 20, 30 on the contact surface 11.

The controlling device 1, 2 comprises sensing means 40 for sensing the position of the controlling member 20, 30 on the contact surface 11 with respect to a reference system. Information regarding said position is contained by an input signal which is transmitted from the sensing means 40 to a processor 50 for generating an output signal on the basis of the input signal and an algorithm laid down in said processor 50.

The controlling device 1, 2 enables a user to control at least one lighting parameter simply by controlling the position of the controlling member 20, 30 on the contact surface 11.

The invention claimed is:

1. A method for controlling at least one parameter related to lighting, the method comprising the acts of:
removably positioning at least one controlling member on a contact surface so that the at least one controlling member contacts the contact surface and is not fixedly attached to the contact surface for movement on the contact surface,
determining a position of the controlling member on the contact surface,
removably positioning a further controlling member on the contact surface, and
calculating an average position based on positions of the at least one controlling member and the further controlling member on the contact surface to determine the at least one parameter.

2. The method according to claim 1, further comprising the act of using a table in order to determine the at least one parameter based on the position of the controlling member with respect to the reference plane, the table comprising combinations of values representing said position and values representing said parameter.

3. A controlling device for controlling at least one parameter related to lighting, comprising:
a contact surface;
first and second controlling members configured to be removably positioned on the contact surface so that the first and second controlling members contact the contact surface;
sensing means for sensing positions of the first and second controlling members on the contact surface; and
a processor configured for calculating an average position based on the sensed positions of the first and second controlling members on the contact surface for determining the at least one parameter.

4. The controlling device according to claim 3, wherein the processor is further configured for determining the at least one parameter based on an input signal generated by the sensing means, and wherein the input signal represents a position of at least one of the first and second controlling members on the contact surface.

5. The controlling device according to claim 4, wherein the processor comprises:
a storage medium in which a table comprising combinations of values representing the position and values representing the at least one parameter are stored, and
a table reader for looking up in the table which value representing the at least one parameter is associated with a given value representing the position.

6. The controlling device according to claim 5, wherein the storage medium is programmable, and further comprising a programming device for adjusting the table.

7. The controlling device according to claim 4, wherein the processor comprises an arithmetic unit in which a relation is laid down for determining a value representing the at least one parameter based on a given value representing the position.

8. The controlling device according to claim 7, wherein the arithmetic unit is programmable, and further comprising a programming device for adjusting the relation laid down in the arithmetic unit.

9. The controlling device according to claim 3, wherein the at least one controlling member is shaped as a ball.

10. The controlling device according to claim 3, wherein at least one of the first and second controlling members is shaped as a pebble, and wherein the contact surface for supporting the first and second controlling members is part of a disc.

11. The controlling device according to claim 3, wherein the sensing means comprise a matrix sensor.

12. The controlling device according to claim 3, wherein the sensing means comprise an optical sensor.

13. A lighting system, comprising a controlling device according to claim 3, and at least one lamp connected to said controlling device.

14. The lighting system according to claim 13, wherein a connection between the at least one lamp and the controlling device is wireless, and wherein the controlling device comprises a transmitter, and the lamp comprises a receiver.

15. A light controller for controlling a light source emitting a light comprising:
a first controlling member;
a second controlling member;
a surface configured to removably receive the first controlling member and the second controlling member; wherein positions of the first controlling member and the second controlling member on the surface are used for determining at least one parameter of the light by a processor configured for calculating an average position based on the positions of the first controlling member and the second controlling member on the contact surface.

16. The light controller of claim 15, wherein a position of the first controlling member on the surface determines color and intensity of the light.

17. The light controller of claim 15, further comprising a sensor configured to detect the positions of the first controlling member and the second controlling member on the surface.

18. The light controller of claim 15, wherein changing a position of the first controlling member simultaneously controls two parameters of the light.

19. The light controller of claim 15, wherein a distance from a center of the surface is associated with intensity of the light so that changing the distance changes the intensity, and wherein an angular displacement of a radial line between the center and the position of the first controlling member is associated with color of the light so that changing the angular displacement changes the color, wherein changing the distance and the angular displacement simultaneously changes the intensity and the color.

20. The light controller of claim 15, wherein a distance from a reference point on the surface is associated with a first parameter of the light, and an angular displacement of a radial line between the reference point and a position of the first controlling member is associated with a second parameter of the light.

* * * * *